United States Patent
Burkhardt et al.

(10) Patent No.: US 6,698,808 B2
(45) Date of Patent: Mar. 2, 2004

(54) MOTOR VEHICLE BUMPER AND MOTOR VEHICLE

(75) Inventors: Steffen Burkhardt, Herrenberg (DE); Dietmar Preissler, Hagenbuch (DE); Anton Sautner, Treuchtlingen (DE)

(73) Assignee: Dynamit Nobel Kunststoff GmbH, Weissenburg (DE)

(*) Notice: Subject to any disclaimer, the term of this patent is extended or adjusted under 35 U.S.C. 154(b) by 0 days.

(21) Appl. No.: 10/298,166

(22) Filed: Nov. 15, 2002

(65) Prior Publication Data

US 2003/0160464 A1 Aug. 28, 2003

(30) Foreign Application Priority Data

Nov. 20, 2001 (DE) .......................................... 101 56 893

(51) Int. Cl.[7] .......................... B60R 19/02; B60R 19/04
(52) U.S. Cl. .................. 293/102; 293/155; 296/187.03
(58) Field of Search ................................. 293/102, 116, 293/132, 135, 155; 296/187.03, 187.11

(56) References Cited

U.S. PATENT DOCUMENTS

| | | | | |
|---|---|---|---|---|
| 3,715,138 A | * | 2/1973 | Finkle | |
| 3,907,352 A | * | 9/1975 | Spain et al. | |
| 4,095,831 A | * | 6/1978 | Hagiwara et al. | |
| 4,225,167 A | * | 9/1980 | Buettner et al. | 293/120 |
| 4,685,712 A | * | 8/1987 | Washowski et al. | 296/128 |
| 4,753,467 A | * | 6/1988 | DeCaluwe et al. | 296/126 |
| 4,877,279 A | * | 10/1989 | Logan | 293/120 |
| 5,022,692 A | * | 6/1991 | Horansky et al. | 293/128 |
| 2001/0038213 A1 | * | 11/2001 | Fox et al. | 293/102 |
| 2003/0141726 A1 | * | 7/2003 | Burkhardt et al. | 293/102 |

* cited by examiner

Primary Examiner—D. Glenn Dayoan
Assistant Examiner—H. Gutman
(74) Attorney, Agent, or Firm—Fulbright & Jaworski L.L.P.

(57) ABSTRACT

A motor vehicle bumper has an internal bumper part mountable on a motor vehicle body. An external bumper part is fastened to the internal bumper part. The internal bumper part includes a base body fastened to the motor vehicle body and a holding bar fastened by a releasable fastener to the base body. An edge of the external bumper part is releasably fastened thereto. The holding bar is unfastened from the base body by the application of force to the external bumper part on the lengthwise direction of a motor vehicle and to the vehicle body.

16 Claims, 4 Drawing Sheets

MOTOR VEHICLE BUMPER AND MOTOR VEHICLE

FIELD OF THE INVENTION

The invention relates to a motor vehicle bumper having a internal bumper part which can be fastened to a motor vehicle body, and a external bumper part fastened at least section-wise to the internal bumper part. The invention relates also to a motor vehicle with a bumper according to the invention.

BACKGROUND AND SUMMARY OF THE INVENTION

In French published patent application 26 34 703 A1 a motor vehicle bumper is disclosed in which the lateral parts of a external bumper part are joined by means of a bipartite support to a motor vehicle body. The bipartite support has two elements which are displaceable against one another. The two elements are displaceable along an inclined plane at an angle to the length of the motor vehicle. In the event of a collision, the lateral parts of the bumper's external part are thereby shifted forward along an inclined plane and away from the lateral parts of the vehicle's body.

In German published patent application 197 08 118 A1 a motor vehicle bumper is disclosed in which the lateral parts of the bumper are releasably fastened to a motor vehicle body. The releasable connection can be designed as a spring clip connection. In the event of a collision, the connection between the lateral parts to the vehicle body is broken and the lateral parts can slide along a ramp provided on the bumper along the motor vehicle body.

Laws in some countries require that motor vehicle bumpers must completely withstand, without damage, any collision of a vehicle at low speed with an obstacle and that a vehicle must remain still driveable, and that, for example, the trunk lock must remain functional. For design reasons, such bumpers, however, must appear to be an integral component of the vehicle. Known releasable bumper mountings have the releasable connection between vehicle body and bumper, and thus are dependent upon close tolerances in the car body.

By the invention a motor vehicle bumper is to be created which will be easy to install and prevent damage to the car body in a low-speed collision.

According to the invention, a motor vehicle bumper is provided for the purpose, having a internal bumper part which can be fastened to a car body, and an external bumper part fastened at least sectionally to the internal bumper part, in which the internal bumper part has a base body fastened to the vehicle body and a holding bar fastened by a releasable fastening means to the base body, to which one edge of the external part is fastened, the junction of the holding bar to the base body being releasable by an application of force to the external part of the bumper in the direction of the length of the vehicle and against the vehicle's body.

Since a holding bar is provided for holding the edge of the bumper's external part, the releasable fastening is not dependent upon tolerances of the car body. Furthermore, the entire bumper including the releasable fastening is fastened to the vehicle body as a unit composed of the bumper's internal part and its external part. It is especially advantageous that such a releasable fastening is provided in the area beneath a trunk lid or tailgate of a vehicle. Since no visible gap or as small a gap as possible is to be present between the bumper and the vehicle body for design reasons, there is the danger that even in a slight collision a front edge of the bumper's external part may strike the vehicle body, especially the region in which the lock of a trunk lid is located, and deform it. Thus there is the danger that this trunk lid can no longer be opened after a slight collision. Since the holding bar separates from the internal part of the bumper in a collision, the front edge of the external bumper part receives freedom of movement, so that damage to the car's body by the front edge of the bumper's external part can be prevented. If desired, the vehicle's body can be configured appropriately so as to provide freedom of movement to the front edge.

In further embodiment of the invention, the releasable fastening is configured as a spring-clip fastening.

By this measure, after a collision, the bumper's external part with the holding bar can be snapped back into the base part of the bumper's internal part. Furthermore, the vehicle's bumper is easy to assemble.

In further embodiment of the invention, the spring clip fastening has at least one bar-like internal element running transversely across the length of the vehicle, and at least one external element clutching the internal element section-wise.

By means of a bar-like element running transversely across the length of the vehicle, a certain tolerance in the transverse direction of the vehicle can be created, which facilitates assembly of the car's bumper. The re-engagement of the spring clip fastening after a collision is thus facilitated.

In further embodiment of the invention, the bar-like internal bumper element has an external surface of a partial cylindrical shape, which corresponds in section to a cylindrical external surface.

In this way the holding bar can execute a swinging movement about an axis running across the vehicle's length. A very slight collision, for example a so-called parking bump, can thus possibly be absorbed by a turning movement of the holding bar and not lead to the opening of the snap fastening. With an eye to the saving of material and weight, the bar-like internal element can have a channel-shaped cross section running across the car's body.

In another embodiment of the invention the external element has a holding section clutching the bar-like internal element section-wise, as well as a guiding section by which the bar-like element is introduced into the holding section when the external element moves onto the internal element.

By these measures the assembly of the vehicle's bumper is facilitated, as well as the refastening of the spring clip fastener after a collision.

In further embodiment of the invention, the outer bumper element has a nub at the transition between the mounting section and the guiding section.

Despite the ease of insertion of the mounting section onto the bar-like element, the holding bar is securely held in the engaged state by the nub.

In further embodiment of the invention the external part of the bumper is biased toward the position connected with the bumper's internal part.

With this measure, when a collision occurs and the external part has been released with the holding bar from the base body of the internal part, it returns automatically to the starting position when the external part of the bumper is again free after, for example, a mild collision. The spring bias of the external part of the bumper toward the position connected with the bumper's internal part is greater than a force needed for engagement of the spring clip fastening.

In further embodiment of the invention, the bumper's internal part has a ribbed configuration.

Thus, a saving of material and weight can be combined with very great stiffness.

In further embodiment of the invention, the bumper's internal part runs substantially along the vehicle body from initial fastening means for fastening the bumper's external part to the vehicle body toward a sill, and it has at least one balcony-like projection underneath the area of the sill, which extends in the lengthwise direction of the vehicle.

Space is thus created for a deformation of the bumper's external part underneath the balcony-like projection. Several balcony-like projections can be disposed one beside the other in the transverse direction of the vehicle.

In further embodiment of the invention, the holding bar is configured as a clamping strip and is provided with clamping ribs running in the lengthwise direction of the vehicle and substantially perpendicular to the length of the vehicle.

By means of such a clamping strip a more secure seating of the edge of the bumper's external part in the holding strip is achieved. In comparison with a solid-surface ramp for gripping the edge of the bumper's external part, clamping ribs have the advantage of a saving of material as well as easier fitting as regards tolerances.

The problem on which the invention is based is also solved by a motor vehicle with a bumper according to the invention, in which the vehicle's body has a deflecting ramp for the holding bar in an area confronting the holding bar.

Thus, in case of a collision, the holding bar and thus the external part of the bumper can be guided in this manner. For example, the deflection ramp slopes forward and downward in the case of a trunk lid, so that the front edge of the bumper's external part is shifted away from the trunk lock area in the event of a collision. Due to the deflection ramp, less space is needed for the same deformation of the front edge than if the front edge were to move exclusively lengthwise of the car body.

In further embodiment of the invention, a deformation body is disposed underneath the bumper's internal part inside of the bumper's external part and is fastened to the vehicle body.

Such division into deformation body and internal part permits the material to be chosen according to the function. For example, the internal part that performs a holding function can be made of plastic, and the one provided for energy absorption can be made of aluminum.

Additional features and advantages of the invention will be found in the claims and the following description of preferred embodiments of the invention in conjunction with the drawings.

DETAILED DESCRIPTION

Figure 1:
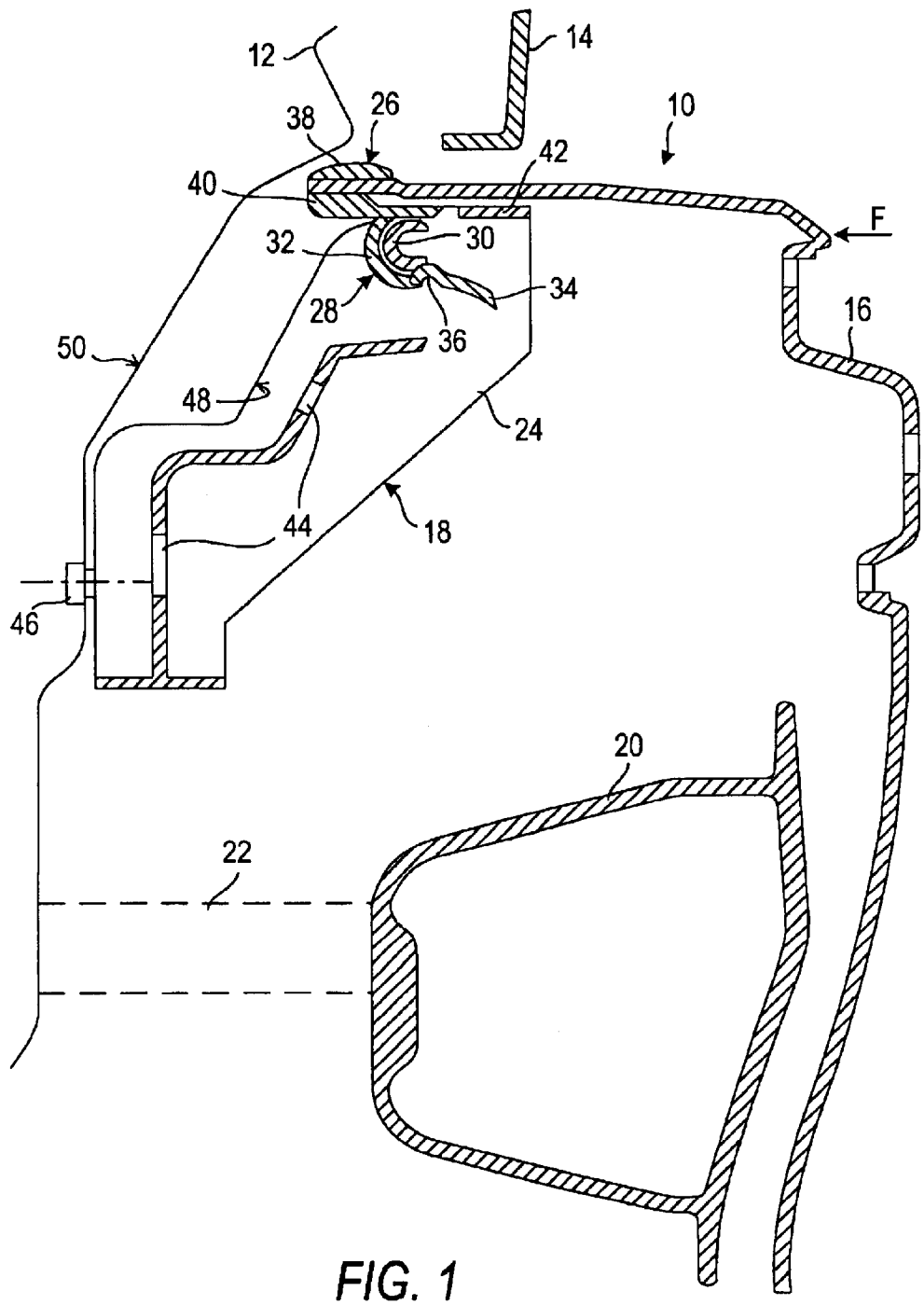
FIG. 1 shows a sectional view of a motor vehicle bumper according to the invention, in a first embodiment.

As represented in FIG. 1, a motor vehicle bumper 10 pursuant to the invention is represented according to a first preferred embodiment of the invention. The motor vehicle bumper 10 is configured as a rear bumper and mounted on a motor vehicle of which only a section of a motor vehicle body 12 and a section of a trunk lid 14 are shown. The bumper 10 has an external part 16 as well as an internal part 18. In a chamber between the external part 16 and the motor vehicle body 12 a deformation body 20 is disposed underneath the internal part 18 of the bumper. The deformation body 20 is connected to the car body 12 by a merely indicated girder 22.

The bumper's internal part 18 consists of a base body 24 and a holding bar 26. The holding bar 26 is releasably fastened to the base body 24 by a snap fastening. The snap fastening is formed by an outer element 28 and an inner element 30 integrally joined to the base body 24. Both the holding bar 26 and the base body 24 consist of injection-molded plastic. The internal element 30 is in bar form and has an outer surface which matches a section of a mantle surface of a cylinder. To save weight and material the inner element 30 has a U-shaped cross section. Clipped onto the cylindrical surface is a mounting section 32 of the outer element 28, which reaches around sections of the inner element 30. The mounting section 32 is adjoined by a guide section 34 which is curved against the mounting section 32. The guide section 34 serves to insert the inner element 30 into the mounting section 32 when the holding bar 26 is pushed against it. When it is in the inserted state the nub 36 retains the holding bar 26.

The holding bar 26 grips the front edge of the bumper's external part in a recess running parallel to the vehicle direction, which is defined on one side by an elongated projection 38 and on the other side by gripping ribs 40. In this manner the front edge of the external part 16 of the bumper is securely gripped in the holding bar 26.

Underneath the trunk lid 14 there is a sill portion of the external part 16 of the bumper. In order to stabilize this sill area, the base body 24 of the internal part 18 of the bumper has a beam-like projection 42 which reaches under the external part 16 of the bumper in the vicinity of the sill and thus stabilizes the external part of the bumper. The base body 24 has a ribbed construction which is provided with openings in order to save material and weight. The base body 24 is fastened to the vehicle body 12 by means of bolts 46 which are indicated only schematically in FIG. 1.

In the case of a slight rear-end collision, a force acts upon the external part 16 of the bumper, which is indicated by an arrow F in FIG. 1. The force F acts in the sense of the length of the vehicle and against the vehicle body 12. The effect of force F on the external part 16 of the bumper is to interrupt the nub connection between the outer element 28 of the holding bar 26 and the inner element 30 of the base body 24. Consequently, the front edge of the external part 16 of the bumper can move toward the vehicle body 12. On the vehicle body 12 a deflecting slope 50 is formed, the result of which is that the holding bar 26 with the forward edge of the external part 16 of the bumper is deflected downward and forward, downward to the left in the drawing of FIG. 1. To enable this deflected movement of the holding bar 26, the base body 24 of the internal part 18 of the bumper is so constructed that, between a front side 48 of the base body 24 and the deflecting ramp 50 of the vehicle body 12, a space remains which is large enough to accommodate a section of the holding bar 26 with the section of the external part 16 of the bumper that is gripped therein. Due to the pop-out action of the holding bar 26 and the deflecting ramp 50, the forward edge of the bumper's external part 16 is deflected forward and downward, so that it cannot damage the body 12 of the vehicle in the event of a collision. In particular, the forward edge of the bumper's external part 16 is deflected away from an area of the vehicle's body 12 in which a lock for the trunk lid 14 is normally situated. This prevents it from happening that the trunk lid 14 can no longer be opened as a result of only a slight collision.

In addition to being fastened to the internal part 18 of the bumper, the external part 16 of the bumper is joined by additional means to the car's body and has an elasticity such that the external part of the bumper is at first gripped in the holding bar 26 which is clamped in the base body 24 in the position represented in FIG. 1. Therefore, in the event of collision, the holding bar 26 comes free from the base body 24 due to the effect of the force F, and shifts together with the sill area of the external part 16 of the bumper into the space between the base body 24 and the deflecting ramp 50 of the vehicle body 12, the holding bar 26 is driven back into the starting position shown in FIG. 1 by the bias of the external part 16 of the bumper when the force F ceases. The spring bias of the external part 16 of the bumper is then greater than any force necessary for snapping the holding bar 26 into the base body 24. After a collision the bumper's external part thus automatically returns to the initial position.

Figure 2:
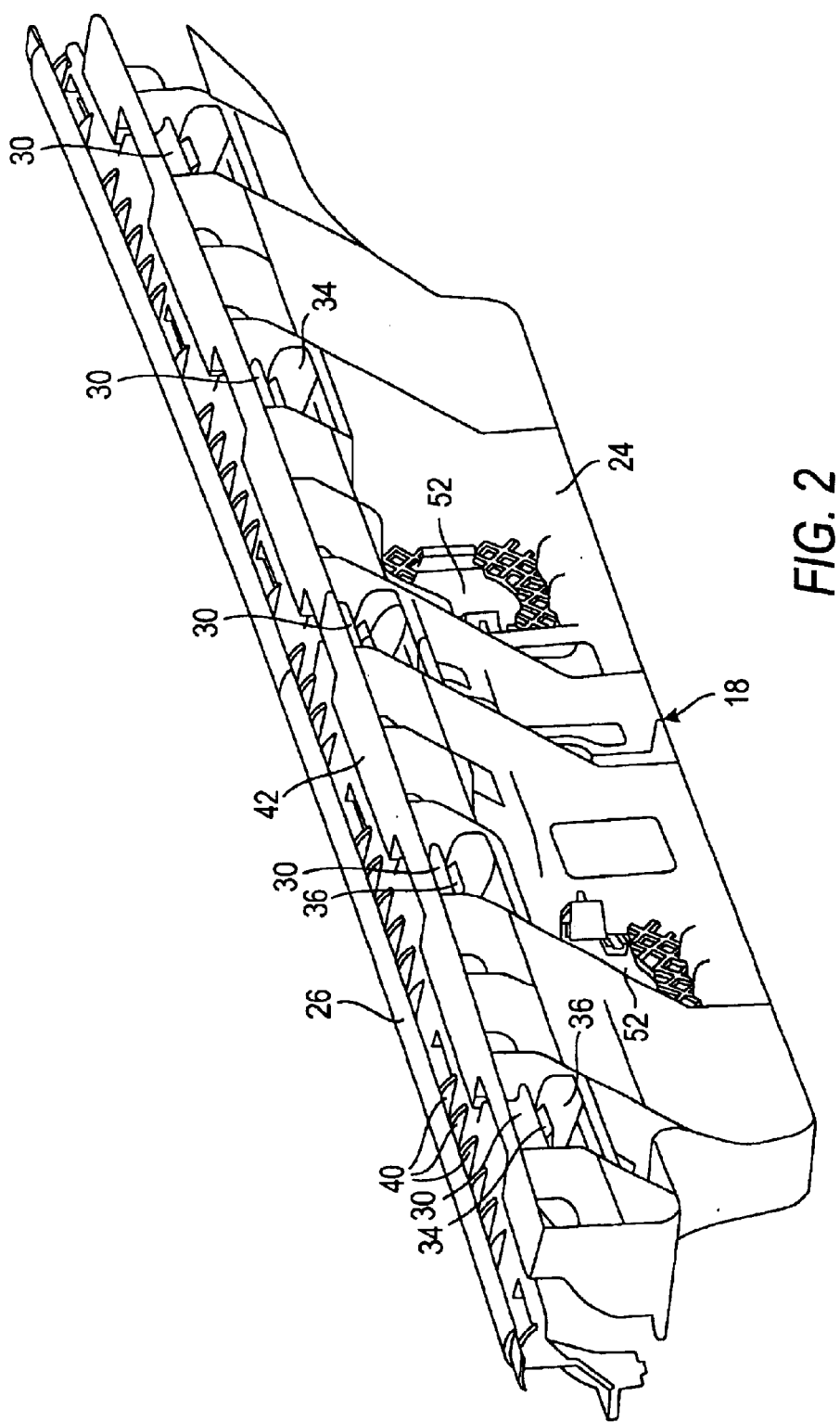
FIG. 2 is a perspective view of the internal part of the motor vehicle bumper of FIG. 1.

The perspective view in FIG. 2 shows the internal part 18 of the bumper at an angle from the rear, i.e., from the side from which the front edge of the external part of the bumper is inserted into the holding bar 26. The rib-like structure of the base body 24 of the internal part 18 of the bumper can clearly be seen in FIG. 2. Thus a high stiffness is achieved in the base body 24. The openings 52 seen in FIG. 2 are provided for the installation of bolts for holding the internal part 18 of the bumper on the vehicle body 12.

Also to be seen are a total of five bar-like internal elements 30 of the base body 24, each surrounded by a mounting section 32 of the holding bar 26. The mounting section 32 is not to be seen in FIG. 2. To be seen, however, are the guides 34 as well as the nubs 36 of the outer elements 28 of the catch connection between holding bar 26 and base body 24.

The holding bar 26 has the ribs 40 for clutching the leading edge of the bumper's external part, and they are arrayed parallel to one another and side by side. Since the holding bar 26 is disposed on the base body 24 for rotation about a line running transversely across the length of the car body, the base body 24 has a balcony-like projection 42 for stabilizing the external part of the bumper near the sill. This balcony-like projection 42 extends substantially across the entire width of the internal part 18 of the bumper.

Figure 3:
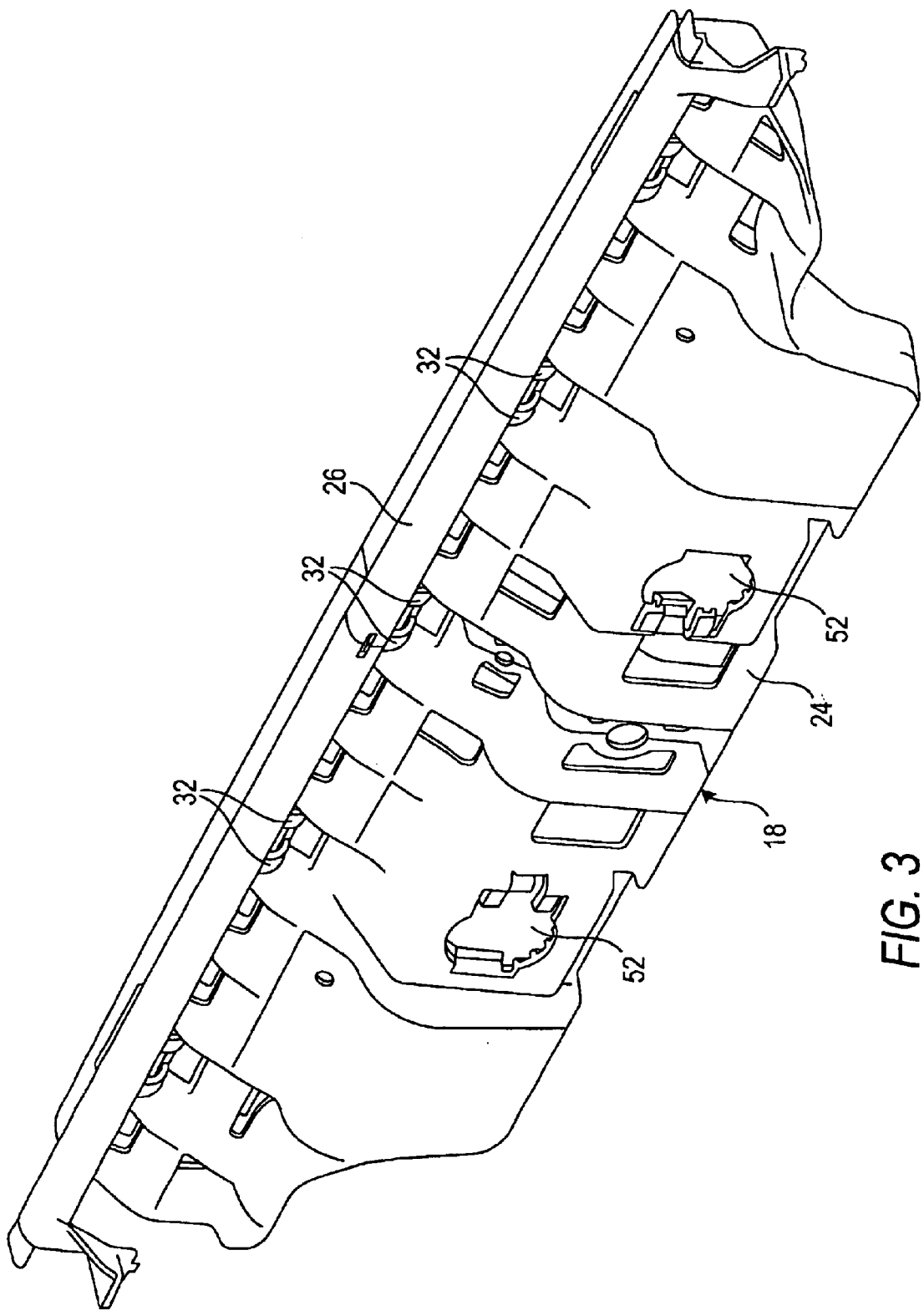
FIG. 3 is another perspective view of the internal part of the motor vehicle bumper of FIG. 1.

In the perspective view in FIG. 3, the internal part 18 of the bumper is shown from the front, i.e., which is visible is one side of the internal part 18 of the bumper, which in the installed state is facing a car body. In this view the mounting sections 32 of the external elements of the catch junction between holding bar 26 and the base body 24 can be seen. The mounting sections 32 consist each of two strips of material which are arcuately curved. These two strips of material running parallel to one another define between them an opening. Since instead of solid material the mounting section is formed of two parallel strips of material, weight can be saved on the one hand, and on the other hand a spring action of the mounting sections can be adjusted by varying the width of the material strips.

As it can be seen in the drawings of FIG. 1 and FIG. 3, the base body 24 runs from the fastening means contained in the openings 52 for fastening onto the vehicle body, first along the vehicle body and then turns away from the latter and finally runs parallel to the vehicle's body at a distance from the latter. As it has been explained, a space is thereby created between base body 24 and the car's body, into which the holding bar 26 can move together with a section of the bumper's external part in the event of a collision.

Figure 4:
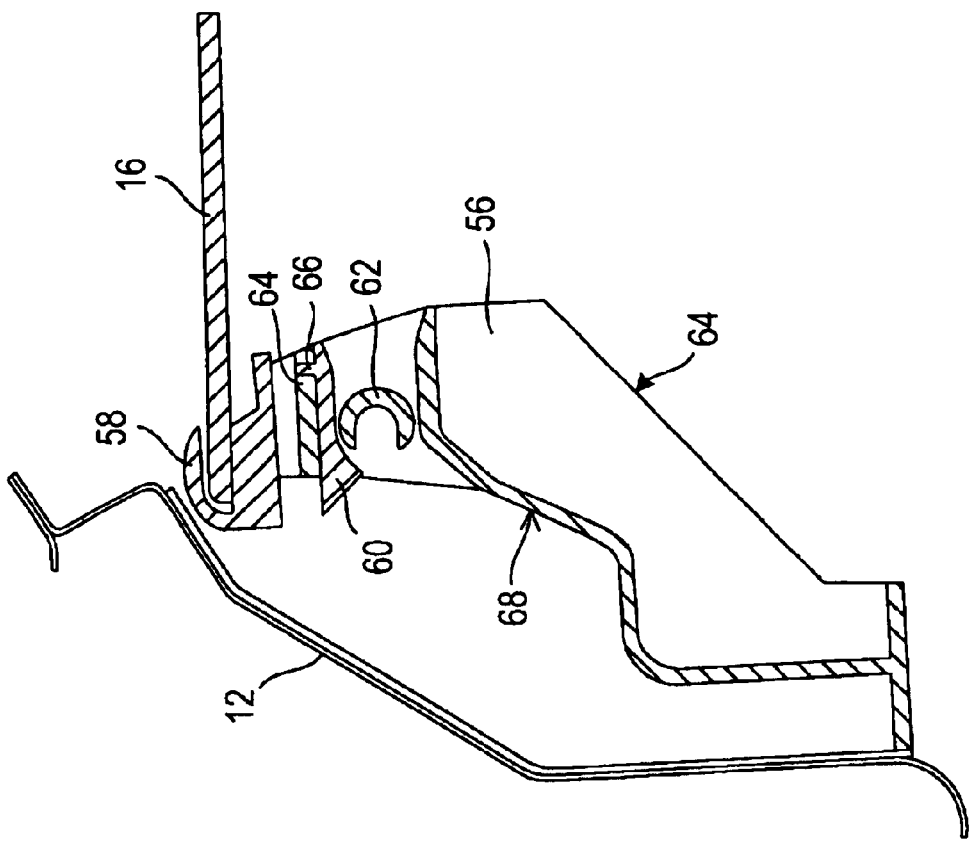
FIG. 4 is a sectional view of an additional embodiment of the motor vehicle bumper according to the invention.

In the fragmentary view given in FIG. 4 another embodiment of the motor vehicle bumper is presented. The embodiment represented in FIG. 4 differs from the embodiment shown in FIGS. 1 to 3 in the configuration of an internal part 54 of a bumper. The internal part 54 consists of a base body 56 and a holding bar 58 into which a front edge of the bumper's external part 16 is gripped. The holding bar 58 is joined by a snap fastening to the base body 56. The snap fastening is formed on sides of the holding bar 58 by an element 60 which is gripped between a bar-like element 62 and a strip-like element 64 of the base body 56. Element 60 of the holding bar 58 has a nub 66 which fits into an opening in the strip-like element 64. The element 60 is wedge-shaped in order to facilitate its insertion between the bar-like element 62 and the strip-like element 64. Between a side of the base body 56 facing the car body a space is formed into which the holding bar 58 can enter together with a section of the bumper's external part 16 in case of a collision.

What is claimed is:

1. A motor vehicle bumper with a internal bumper part mountable on a motor vehicle body and a external bumper part fastened the internal bumper part wherein the internal bumper part comprises: a base body fastened to the motor vehicle body and a holding bar fastened by a releasable fastener to the base body, to which an edge of the external bumper part is fastened, wherein the fastening of the holding bar to the base body is releasable by the application of force to the external bumper part on the lengthwise direction of a motor vehicle and to the vehicle body.

2. A motor vehicle bumper according to claim 1, wherein the releasable fastener is configured as a snap fastener.

3. A motor vehicle bumper according to claim 2, wherein the snap fastener has at least one bar-like inner element running in the transverse direction of the vehicle and at least one outer element sectionally encompassing the bar-like element.

4. A motor vehicle bumper according to claim 3, wherein the bar-like inner element has an outer surface which corresponds sectionally to a cylindrical mantle surface.

5. A motor vehicle bumper according to claim 3, wherein the outer element has a mounting section sectionally encompassing the bar-like inner element as well as a guiding section by means of which the bar-like element is inserted into the mounting section when the outer element is moved toward the inner element.

6. A motor vehicle bumper according to claim 5, wherein the outer element has a nub at the transition between the mounting section and the guiding section.

7. A motor vehicle bumper according to claim 1, wherein the external bumper part is biased to the position joined to the internal bumper part.

8. A motor vehicle bumper according to claim 1, wherein the internal bumper part has a ribbed structure.

9. A motor vehicle bumper according to claim 1, where the internal bumper part has at least one balcony-like projection underneath an area of a trunk lid.

10. A motor vehicle bumper according to claim 1, wherein the holding bar is in the form of an elongated spring clip.

11. A motor vehicle bumper according to claim 10, wherein the spring clip is provided with clamping ribs arranged substantially perpendicular to the transverse direction of the vehicle.

12. A motor vehicle with bumper according to claim 1, wherein the vehicle body has a deflecting ramp for the holding bar in an area confronting the holding bar.

13. A motor vehicle according to claim 12, wherein the base body of the bumper's internal part and the deflecting ramp of the vehicle body form a space into which the holding bar with a section of the bumper's external part can be moved.

14. A motor vehicle according to claim 12, wherein underneath the internal bumper part, a deformation body is disposed within the external bumper part and is fastened to the vehicle body.

15. A motor vehicle bumper according to claim 4, wherein the outer element has a mounting section sectionally encompassing the bar-like inner element as well as a guiding section by means of which the bar-like element is inserted into the mounting section when the outer element is moved toward the inner element.

16. A motor vehicle according to claim 13, wherein underneath the internal bumper part, a deformation body is disposed within the external bumper part and is fastened to the vehicle body.

* * * * *